May 14, 1968 McNEIL BRYAN ETAL 3,383,468
SOLENOID OPERATED CONTACT PINS FOR INSERTION
INTO A TELEPHONE JACK
Filed Aug. 6, 1964

INVENTORS
JAMES E. MOORE, JR.
McNEIL BRYAN
BY Thomas J. Nikolai
ATTORNEY 3,383,468
Patented May 14, 1968

3,383,468

SOLENOID OPERATED CONTACT PINS FOR INSERTION INTO A TELEPHONE JACK

McNeil Bryan, Centerville, and James E. Moore, Jr., North Oaks, Minn., assignors to Lindsay Controls, Inc., St. Paul, Minn., a corporation of Minnesota Filed Aug. 6, 1964, Ser. No. 387,894
2 Claims. (Cl. 179—5)

ABSTRACT OF THE DISCLOSURE

A solenoid actuated electrical coupler for connecting a message transmitting device to a telephone line upon activation.

This invention relates generally to automatic alarm apparatus adapted to automatically "dial" predetermined telephone numbers in the event of an abnormal condition, and more specifically to a device for establishing a connection to a telephone line such that dialing pulses and/or other information can be transmitted over the lines.

In a copending patent application Ser. No. 219,209, filed Aug. 24, 1962, by James E. Moore, Jr., entitled, "Fire-Intrusion Automatic Telephone Dial Alarm Device" (now Patent 3,287,500), which is assigned to the assignee of the present invention, there is described an automatic fire-intruder alarm system which includes a magnetic tape playback system which is connected to a telephone and which, when activated, is capable of "dialing" a predetermined number. After a connection to a remote station is established, a pre-recorded message is played over the telephone to advise authorities of the abnormal condition detected at the sending station. While the device described in the above-referenced application operates satisfactorily, some resistance has been met in the marketing of it because of certain tariff regulations of the major telephone companies serving the United States. Generally speaking, these regulations forbid attaching equipment not approved by the telephone company to their facilities.

The present invention provides a means which will connect the automatic telephone dialing alarm device to the telephone lines only in the event of an abnormal condition, e.g., the occurrence of a fire or the detection of an intruder, but which is otherwise at all times completely isolated from the telephone facilities. Hence, it is expected that by using the present invention there will be no violation of existing regulations.

In its simplest form, the preferred embodiment of the present invention comprises an electromechanical device which is effective to insert contact pins into a standard telephone jack only in the event of an abnormal condition, but which in the standby condition provides complete isolation from the telephone lines. The device includes solenoid operated contact pins. The solenoid is normally de-energized and the contact pins are out of engagement with the female terminals of the standard telephone jack. When an alarm condition is detected by the system sensors, the automatic telephone dialing alarm device provides a current to the solenoid causing it to be energized. The energization of the solenoid moves its armature and effects the insertion of the contact pins into the female receptacle, such that the "dialing" pulses and the recorded voice message can be played over the phone lines to a remote receiving station. Upon cessation of the alarm condition, the device operates to disconnect the contact pins from the telephone jack or receptacle.

It is accordingly an object of the present invention to provide a device for use with an automatic telephone dialing alarm system which, when activated, operates to connect the alarm system to the telephone lines only when an abnormal condition is detected.

Another object of this invention is to provide solenoid operated mechanism for establishing the connection of a telephone alarm system to the telephone lines.

A still further object of the invention is to provide a device of a simple design which is inexpensive to manufacture and operate, compact and small in size, and is positive in its performance.

Other objects and advantages will become apparent to those skilled in the art upon reading the following specification taken in conjunction with the accompanying drawings, in which like numerals designate corresponding parts throughout the several views, and wherein.

Figure 1:
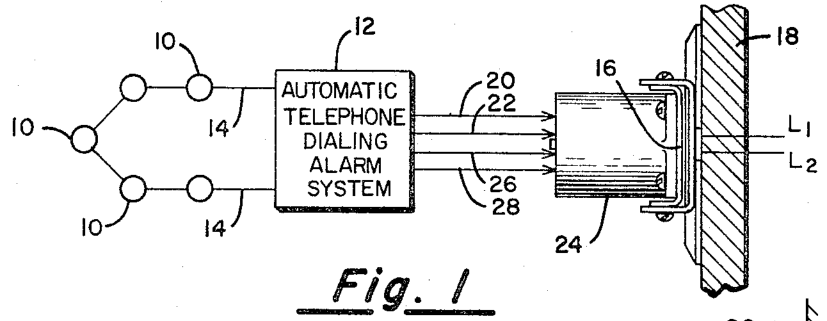
FIG. 1 is a block diagram representation of the alarm system.

Referring now to FIGURE 1, there is shown a block diagram of the alarm system incorporating the present invention. A plurality of sensing devices 10 are distributed throughout an area to be protected and may, for example, take the form of thermostatic type switches for over-temperature sensing or any one of a number of different devices commonly employed for sensing the presence of an intruder. The sensing devices 10 are connected into the automatic telephone dialing alarm system 12 by the loop conductors 14. A typical example of an alarm device is fully described in the afore-referenced Moore patent. The device described in that patent becomes operative in the event of an over-temperature condition or the presence of an intruder to automatically dial a telephone number and subsequently play a recorded voice message over the telephone lines after a connection has been established to a receiving telephone station.

In FIGURE 1 the lines $L_1$ and $L_2$ represent telephone lines leading from a standard wall-type plug-in telephone jack 16 mounted on a wall 18 to a telephone exchange (not shown). The jack 16 may be flush mounted as shown in FIGURE 1 or may be surface mounted as shown in the side elevation of FIGURE 4. The lines 20 and 22 leading from the alarm device 12 into the cover member 24 terminate at a plug (not shown in FIGURE 1) contained within the cover. This plug is adapted to be inserted into the jack 16 such that a continuous electrical connection can be made between the alarm system 12 and the telephone lines $L_1$ and $L_2$.

The conductors 26 and 28 leading from the alarm device 12 and entering the cover 24 surrounding the jack 16 supply the power for operating the device for inserting the plug terminals into the jack 16. A reading of the afore-referenced Moore patent clearly illustrates that the voltages necessary are available for supplying signals to the plug inserting device of the present invention.

Figures 2, 3:
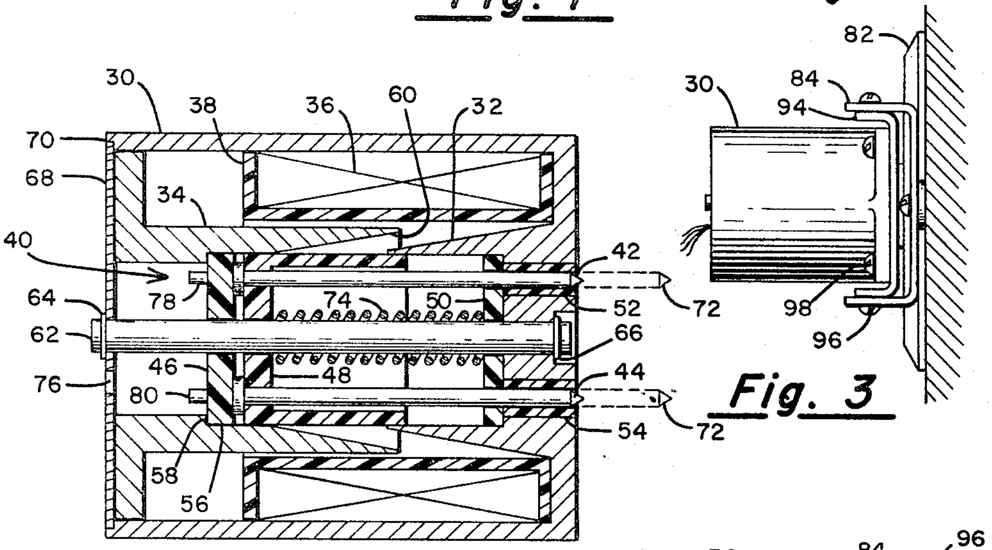
FIG. 2 is a cross-sectional view of the present invention which shows the arrangement of the various functional parts.
FIG. 3 is a side view of the present invention particularly showing the manner in which the apparatus of FIGURE 2 may be used with a flush mounted telephone jack.

For a clearer understanding of the operation of the present invention, reference is made to the cross-sectional view of FIGURE 2, which clearly illustrates the arrangement of the various functional parts comprising this invention. In FIGURE 2, there is shown a cylindrical housing or shell 30 which may be machined from a high permeability steel or other suitable material. Projecting inwardly from the right-hand side of the shell is a sloping ramp-like projection 32 which serves as a stop member for the armature 34 when it is urged forward upon energization of the solenoid winding 36. The winding 36 is wound on an insulating bobbin 38 which is slightly larger in diameter than the armature 34. The winding 36 therefore forms the toroidal core member of the solenoid.

Contained within and concentric with the armature 34 is the movable plug member indicated generally by numeral 40. The plug member 40 comprises a pair of slidably mounted contact pins 42 and 44 which may be formed from brass and provided with a high conductivity coating such as gold or silver. The pin members 42 and 44 are constrained such that motion is permitted only in the axial direction of the cylindrical solenoid assembly by the guides 46, 48 and 50 and by the bushings 52 and 54. The guides and bushings are preferably formed from nylon but any other suitable material may be employed.

As shown in FIGURE 2, the armature member 34 has a notched-out portion 56 of slightly larger diameter than the diameter of the guides 46 and 48. This notch defines a circular rim 58 which butts up against the left side of the guide 46. Therefore, when the solenoid is actuated by passing a current through the winding 36, the armature 34 seeks to center itself within the magnetic field of the winding, thereby urging the plug assembly 40 to the right. The extent of the motion of the armature and the plug assembly is limited by the stop member 32 which is parallel but spaced apart a predetermined distance from the sloping portion 60 of the armature 34.

The entire assembly is held together by means of a tie rod 62 which is coaxial with the shell 30 as well as with the armature 34 and the guide members 46, 48 and 50. Snap rings 64 and 66 hold the assembly together by urging the end plate 68 tightly against the shoulder 70 provided in the left end of the cylindrical shell 30. One skilled in the art can readily visualize the simplicity of the construction of the solenoid and the ease with which it may be assembled or disassembled.

In order to return the plug assembly 40 from its energized position indicated by the dashed lines 72 to the de-energized position illustrated in FIGURE 2, a compression spring 74 is provided which surrounds the tie-rod 62 and abuts the guide members 48 and 50. Because the guide member 50 is held stationary within the shell of the solenoid whereas the guide members 46 and 48 are free to move in an axial direction, it can be seen that the return spring 74 will be effective to urge the armature 34 and plug member 40 to the left. The spring 74 is designed to provide a force sufficient to overcome the frictional forces which may exist between the pins 42 and 44 and the female receptacles in the jack 16. Similarly, the field provided by the current flowing through the winding 36 must be of sufficient magnitude to overcome the counteracting force of the return spring and also permit the motion of the armature and the insertion of the pin members 42 and 44 into the female receptacles.

The electrical leads connecting the automatic telephone dialing alarm system 12 to the contact pins 42 and 44 pass through an aperture 76 provided in the end plate 68. For clarity in the drawings these electrical leads are not shown. However, they may be attached to the end portions 78 and 80 of the pins which extend through the guide member 46 to the left by any suitable means such as soldering or by means of a mechanical clip connector.

Figure 5:
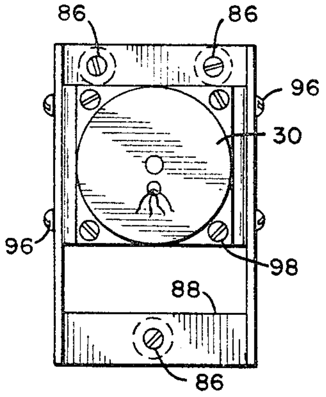
FIG. 5 is a right end view of the apparatus of FIGURE 4.
Figure 6:
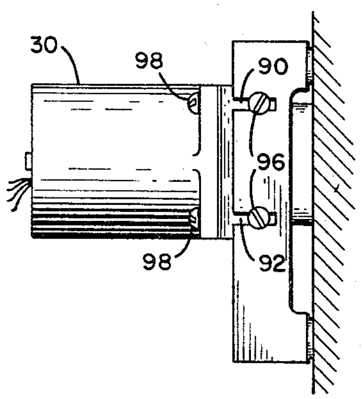
FIG. 6 is a top view of the apparatus of FIGURE 4.

Referring now to FIGURE 3 there is more clearly shown the manner in which the solenoid operated plug member of FIGURE 2 may be mounted with respect to the telephone jack when the jack is flush mounted in the wall 18. For decorative purposes, a coverplate 82 is used to cover the installation of the telephone jack within the wall. From FIGURES 3 and 5 it can be seen that an outer mounting bracket having a U-shaped cross-section is adapted to be mounted on the wall by means of the screws 86. A cut-out area 88 in the bottom of the bracket or channel 84 is dimensioned to surround the coverplate 82. As is shown in FIGURE 6, the bracket 84 has a pair of slots 90 and 92 on each of the outwardly extending sides thereof.

A second channel or U-shaped bracket 94 is designed to fit within the channel 84 and is secured thereto by means of the screws 96, which pass through the slots 90 and 92 and into tapped holes provided in the bracket 94. Because of the slots 90 and 92, the inner bracket member 94 may be adjustably positioned with respect to the telephone jack. The solenoid assembly is mounted on the bracket 94 by means of the mounting screws 98. An aperture (not shown) is cut in the inner bracket 94 such that the pins 42 and 44 may pass therethrough and into the telephone jack upon energization of the solenoid winding.

Figure 4:
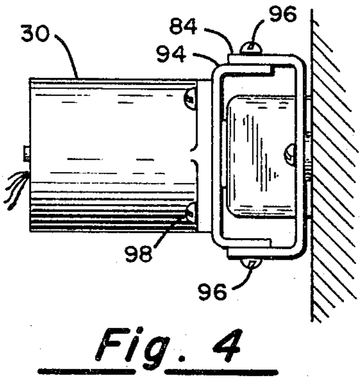
FIG. 4 is a side view of the present invention particularly showing the manner in which the apparatus of FIGURE 2 may be used with a surface mounted telephone jack.

FIGURE 4 clearly illustrates the manner in which the same mounting hardware can be used when the telephone jack 16 is surface mounted rather than flush mounted as is illustrated in FIGURE 3. By simply inverting the inner bracket 94 so that the openings of the channels face in opposite direction rather than in the same direction, proper spacing is provided to accommodate the jack 16 within the chamber defined by the opposite facing bracket members 94 and 84. Again, because of the slotted mounting arrangement, the spacing between the pins 42 and 44 when in the de-energized position and the corresponding female terminals of the jack 16 is adjustable.

Thus, it can be seen that there is provided a device to be used with a telephone alarm system which maintains the alarm system completely isolated from telephone company equipment in the absence of an abnormal condition, but which is effective upon manual activation or upon the detection of an abnormal condition, to establish an electrical connection between the alarm device and the telephone lines.

Although the present invention has been shown and described with reference to a single preferred embodiment, it will be appreciated that changes and modifications may be made from a knowledge of the teachings of the present invention which do not, in truth and in fact, depart from the concept of the invention. Hence, the invention is not to be limited or destricted to precisely what is shown and described, but rather, should be construed in the light of the fundamentally new principles as embodied in the teachings disclosed herein.

What is claimed is:

1. In an automatic telephone dialing device of the type adapted to transmit dialing pulses over telephone lines to establish a connection to a remote location when actuated, the combination comprising a telephone jack having a plurality of terminals coupled to a telephone exchange; a plug having a plurality of contacts adapted to mate with the terminals of said telephone jack; means for mounting said plug so as to be normally physically and electrically isolated from said telephone lines; an automatic telephone dialing device having first and second sets of conductors adapted to carry electrical current from said dialing device upon the occurrence of a predetermined event; means connecting said first set of conductors to said plurality of contacts; a solenoid actuator having an armature and windings, said armature being connected to said plug for imparting translational motion to said plug upon electrical energization of said windings; and means connecting said windings to said second set of conductors such that the energization of said winding by electrical current from said dialing device causes said plug to be moved into electrical contact with the terminals of said jack only upon the actuation of said dialing device to permit the transmission of dialing pulses from said dialing device to said telephone exchange.

2. In an automatic telephone dialing system of the type adapted to transmit dialing pulses over telephone lines to establish a connection to a remote location upon the detection of a predeermined condition, the combination comprising a telephone jack having a plurality of terminals connected to a telephone exchange; a plug having a plurality of terminals adapted to be inserted in said jack; a first channel member adapted to be positioned over said telephone jack and secured to a wall, said channel having a plurality of slots in the side walls thereof; a second channel dimensioned to fit within said first channel and, secured thereto by connecting means passing through said slots; an automatic telephone number dialing device connected to said plug; moving means mounted on said second channel and operatively connected to said plug responsive to a signal from said device for moving said plug into mechanical and electrical engagement with said jack only upon the actuation or said device by the occurrence of a pre-determined condition, such that dialing pulses can be transmitted from said alarm device to said telephone exchange.

References Cited

UNITED STATES PATENTS

| | | | |
|---|---|---|---|
| 1,244,950 | 10/1917 | Brown | 339—34 |
| 2,879,495 | 3/1959 | Ingram | 339—45 |
| 2,780,671 | 2/1957 | Thery | 179—5 |
| 3,087,991 | 4/1963 | Anderson et al. | 179—5 |
| 3,209,075 | 9/1965 | Farmer et al. | 179—5 |

ROBERT L. GRIFFIN, *Primary Examiner.*

W. S. FROMMER, *Assistant Examiner.*